United States Patent [19]

Guion

[11] Patent Number: 4,908,499

[45] Date of Patent: Mar. 13, 1990

[54] REVALIDATABLE SERVICE SUPPLYING SYSTEM

[75] Inventor: Christian Guion, Verrières le Buisson, France

[73] Assignee: Schlumberger Industries, Montrouge, France

[21] Appl. No.: 135,095

[22] Filed: Dec. 18, 1987

[30] Foreign Application Priority Data

Dec. 19, 1986 [FR] France .................................. 86 17800

[51] Int. Cl.⁴ ............................................. G06K 5/00
[52] U.S. Cl. ................................... 235/380; 235/436; 235/449; 902/4
[58] Field of Search ............... 235/380, 381, 436, 449; 902/4

[56] References Cited

U.S. PATENT DOCUMENTS

| 4,013,894 | 3/1977 | Foote et al. | 902/4 X |
| 4,346,290 | 8/1982 | Rossi | 235/449 X |
| 4,385,231 | 5/1983 | Mizutani et al. | 902/4 X |
| 4,395,626 | 7/1983 | Barker et al. | 235/380 X |
| 4,620,727 | 11/1986 | Stockburger et al. | 235/380 X |
| 4,629,873 | 12/1986 | Stockburger et al. | 235/380 |

Primary Examiner—David L. Trafton
Attorney, Agent, or Firm—Sanford J. Asman

[57] ABSTRACT

The system comprises memory cards and card readers. The card memories (MEM) include validation memory points $V_j$ and credit memory points $C_{i,j}$. The addresses of the validation points $V_j$ and the addresses of the associated credit point $C_{i,j}$ are defined by a reference table (TRR) and a permutation table (TP) which make use of a data item ($Z_F$) which is specific to the card.

6 Claims, 4 Drawing Sheets

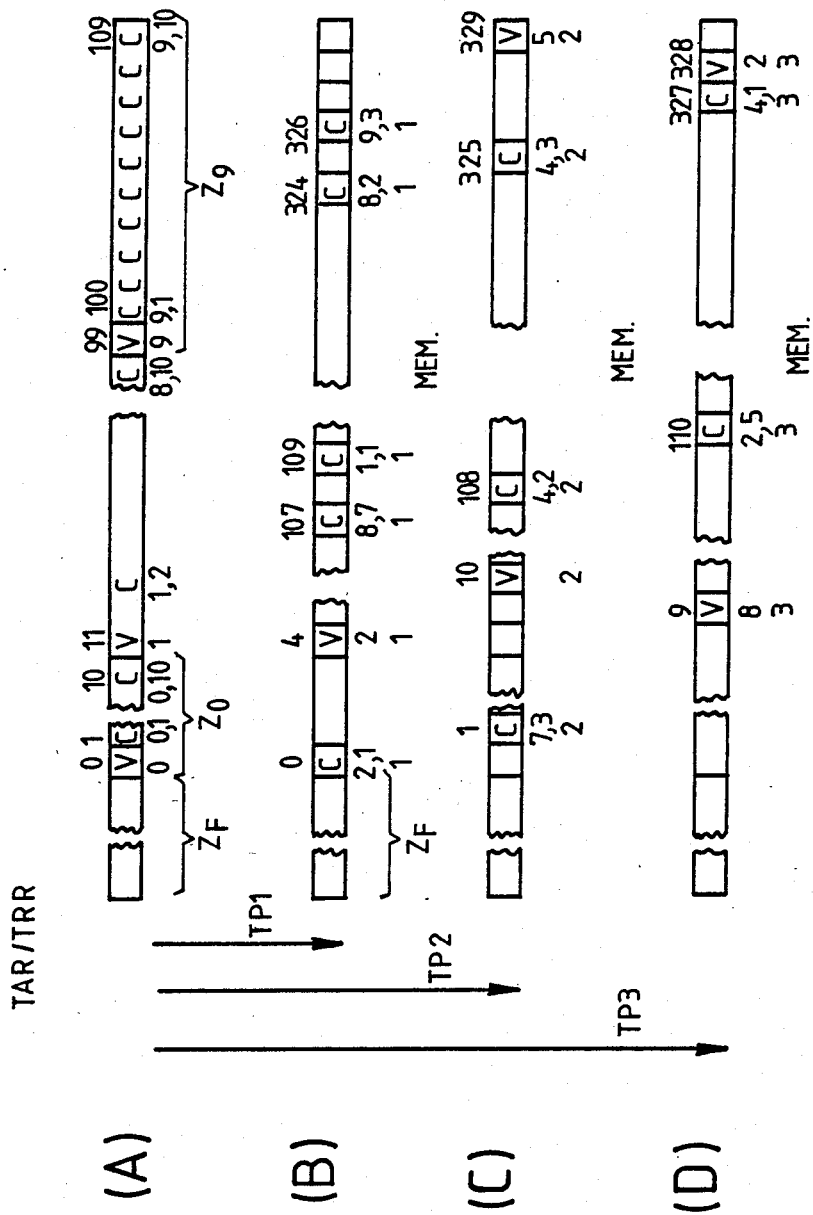

REVALIDATABLE SERVICE SUPPLYING SYSTEM

The present invention relates to a revalidatable service supplying system.

More precisely, the invention relates to such a system in which the user uses a portable data medium, e.g. a card, representing an initial amount of credit and which is used each time a service or services is/are to be obtained, with the balance available on the card being updated each time a service is supplied. When the balance in the card becomes zero the user may refill the card to a new amount of credit by paying the corresponding amount of money.

BACKGROUND OF THE INVENTION

So-called "prepayment" cards are known that may be purchased from an organization which supplies a service, with the card including magnetic or electronic memory means for storing a credit balance. With such cards, each time a service is supplied, the balance is reduced by an amount which corresponds to the service supplied. When the entire initial credit has been used, the card is thrown away. This system is well-known for pay phones and for gasoline stations. The pay phone or the gas pump is provided with a "card reader" which identifies the card and which deducts an amount therefrom corresponding to the telephone call made or to the quantity of gas delivered.

The drawback of such cards is that the cost of manufacturing them is not negligible compared with the necessarily small amount of money which a user is prepared to "prepay" in order to obtain the service provided.

In order to remedy this drawback, so-called "re-fillable" or revalidatable cards have been proposed, i.e. cards in which it is possible to record a new balance after the initial balance has been completely spent by paying the amount of credit by which the card is refilled. The problem of this type of card naturally consists in preventing the cardholder from fraudulently refilling the card without making the corresponding payment to the organization which provides the service. To do this, proposals have been made to split the memory in which the amounts of credit are recorded into a plurality of zones that should be validated in succession. In order to verify that successive validations are licit, the card includes a zone in its memory for validating the successively validatable credit zones. Access can be obtained to the validation zone only by means of a secret encoding key which is stored in the card.

The defects of such a system are clear. Firstly it is inapplicable to a card having a magnetic memory. Secondly, even with a card having an electronic memory, it requires access-controlling circuits which are complex and therefore expensive in addition to the memory.

In order to remedy these drawbacks, an object of the invention is to provide a system for supplying services using portable data mediums, which system is compatible with magnetically recording successive balances and which allows the data medium to be successively refilled under acceptable conditions of security.

SUMMARY OF THE INVENTION

In order to achieve this aim, the invention is based on the following principle: the storage means of the data medium comprise a plurality of data "points". In our time, the memory means comprise a validation zone and a plurality of successively validatable expenditure zones. The validation zone contains as many validation points as there are expenditure zones, and each expenditure zone contains as many expenditure points as there are service supply units. However, according to the invention, the locations or addresses of the validation points and the expenditure points are pseudo-randomized in such a manner that a fraudster cannot tell whether a point occupying a given location or a given address is a validation point or an expenditure point. In order to process these data mediums, card readers include means for defining the locations of those points that are expenditure points and of those points which are validation points. This definition is performed by implementing a secret algorithm which makes use of a parameter constituted by a fixed data item stored in the data medium and specific to each individual data medium.

It will thus be understood that a very large number of different definitions exist for the locations of validation points and of expenditure points. As a result, even if a fraudster should make licit use of a card in order to determine the physical addresses of the validation points and of the expenditure points of a particular card, that would still not suffice for fraudulently validating the various expenditure zones of another card, since the other card would have the locations of its memory points defined differently.

In an improved implementation of the invention, the card reader further includes a circuit for detecting abnormal configurations of the points cancelled in the card memory. An abnormal configuration exists if the card has expenditure points cancelled when the corresponding validation points have not been cancelled. This could also occur if the expenditure points that have been cancelled in a correctly validated zone are not those points which ought to have been cancelled first in normal operation of the card reader. This could also occur if a validation point has been cancelled while other validation points which ought to have been cancelled sooner have not been cancelled. Naturally, if an abnormal configuration is detected, the card is invalidated.

BRIEF DESCRIPTION OF THE DRAWINGS

Embodiments of the invention are described by way of example with reference to the accompanying drawings, in which:

FIG. 4 is a diagram similar to FIG. 1 showing a system for providing a plurality of different services.

DETAILED DESCRIPTION OF THE PREFERRED EMBODIMENTS

Before describing the details of the system, its principles are described with reference to FIG. 1.

The service-supplying system operates with memory cards and service-supplying machines capable of reading the data stored in the cards, of supplying a service to an amount requested by the user providing predetermined conditions are satisfied, and for deducting an amount of credit corresponding to the service received.

The cards used are revalidatable. This thus means that the memory of the card is divided into a plurality of zones, each of which gives access to the supply of a service up to a given amount of credit. When the amount corresponding to a zone has been spent, it is necessary for a new zone to be validated in order to obtain a new amount of service.

More precisely, the card memory is constituted by a plurality of memory points. In normal operation, each memory point may have one of two binary states. An unused or "blank" state and a written-to or "cancelled" state. The memory is divided into a first zone containing fixed or unchanging data, a validation zone, and a plurality of expenditure zones to which access is controlled by the state of the validation zone. Each memory point has a physical address in the memory, and this address allows the card reader to change the point corresponding to said address from the "blank" state to the "cancelled" state.

Each memory point in an expenditure zone corresponds to one unit of supplied service, with the value of a unit being defined by fixed data stored in the first memory zone.

In prior systems, there is a validation zone occupying successive physical addresses and a succession of successively validatable expenditure zones whose memory points that are to be cancelled successively correspond to memory points whose physical addresses are also in succession. The system is protected by an encoding key stored in the card and by circuits for decoding and for comparison, which circuits control access to the validation zone.

As already mentioned, the invention is based on a very different principle which consists in the fact that if each memory point of the card is considered as having a given physical address, only the card reader can tell whether the point is a validation point or an expenditure point, and if it is an expenditure point which validation point it depends from. A fraudster can therefore never be sure what physical address needs to be cancelled in order to validate a new expenditure zone. Further, since this relationship depends on particular information stored in each card, even if a fraudster does find out the meanings of the physical addresses of the memory in a given card, it is still not possible to obtain a priori information about the meanings of the physical addresses on another card.

Figure 1:
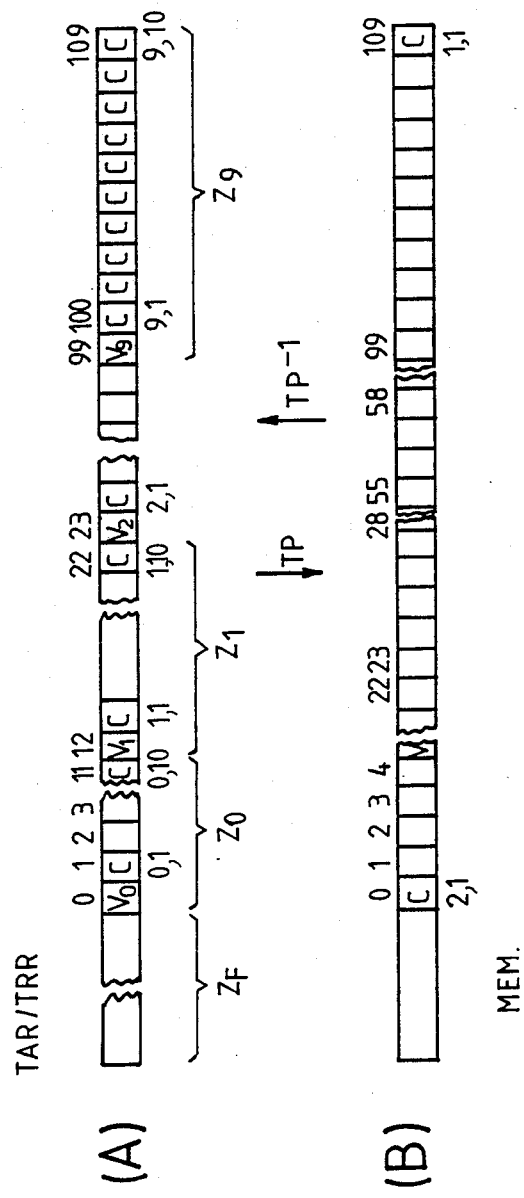
FIG. 1 is a diagram showing one example of correspondence between the reference addresses of the memory points and the physical addresses of the same memory points.

In FIG. 1, diagram A is a table showing the relationships between the reference addresses of card memory points and the corresponding meanings of the memory points. The term "meaning of a memory point" is used to distinguish between points which are validation points and points which are expenditure points, and if a point is an expenditure point, the identity of the validation point from which it depends. In diagram A, the top line gives the reference addresses, the middle line gives the meanings of the corresponding memory points, and the bottom line gives the relationship which exists between a validation point and the associated expenditure points. The address numbering shown in diagram A relates only to the validation memory points and to the expenditure memory points and it does not relate to the memory points that correspond to fixed data which occupies a zone $Z_F$.

In the example shown, there are 110 memory points uniformly distributed into ten sectors referenced $Z_0$ to $Z_9$. In each sector $Z_i$, the memory point having the first reference address is the validation point for the next ten memory points. In other words, reference addresses 0, 11, 22, ..., 99 correspond to validation points $V_0$, $V_1$, ..., $V_9$. In the zone $Z_0$, points having reference addresses 1, 2, ..., 10 correspond to expenditure points $C_{0,1}$, $C_{0,2}$, ..., $C_{0,10}$; ... and points having reference addresses 100, 101, ..., 109, correspond to expenditure points $C_{9,1}$, ..., $C_{9,10}$ which are associated with validation point $V_9$. Further, in normal operation of the utilization under consideration, the validation points $V_i$ must be cancelled in order of increasing index number, and successive supplies of service take place by cancelling expenditure points $C_{i,j}$ in increasing order of the index j.

Thus, diagram A defines a reference address table (TAR) for associating a validation point $V_i$ or an expenditure point $C_{i,j}$ with each reference address, together with a reference relationship table (TRR) which gives the order in which validation points should be cancelled, the relationship between each validation point and the associated expenditure points, and the order in which the expenditure points $C_{i,j}$ associated with each validation point $V_i$ should be cancelled.

We now consider diagram B which gives the relationship between the physical address of a memory point and a meaning of that point. For example, address 0 corresponds to expenditure point $C_{2,1}$; address 4 corresponds to validation point $V_2$;...; address 109 corresponds to expenditure points $C_{1,1}$. A permutation table TP sets up a one-to-one relationship between the reference address of a particular point $V_i$ or $C_{i,j}$ and the physical address of that point in the card memory. This permutation table TP is generating using a pre-established algorithm (ALG) which is a function of fixed data (IF) stored in the zone $Z_F$ of the memory. Using a common algorithm ALG each fixed data item establishes a specific permutation table TP.

In the above-described example, the reference address table (TAR) and the reference relationship table (TRR) correspond to a "logical" disposition. However, the person skilled in the art will easily understand that the tables (TAR) and (TRR) could correspond to any arbitrary, but known, disposition of the addresses of $V_i$ and of $C_{i,j}$.

Figure 2:
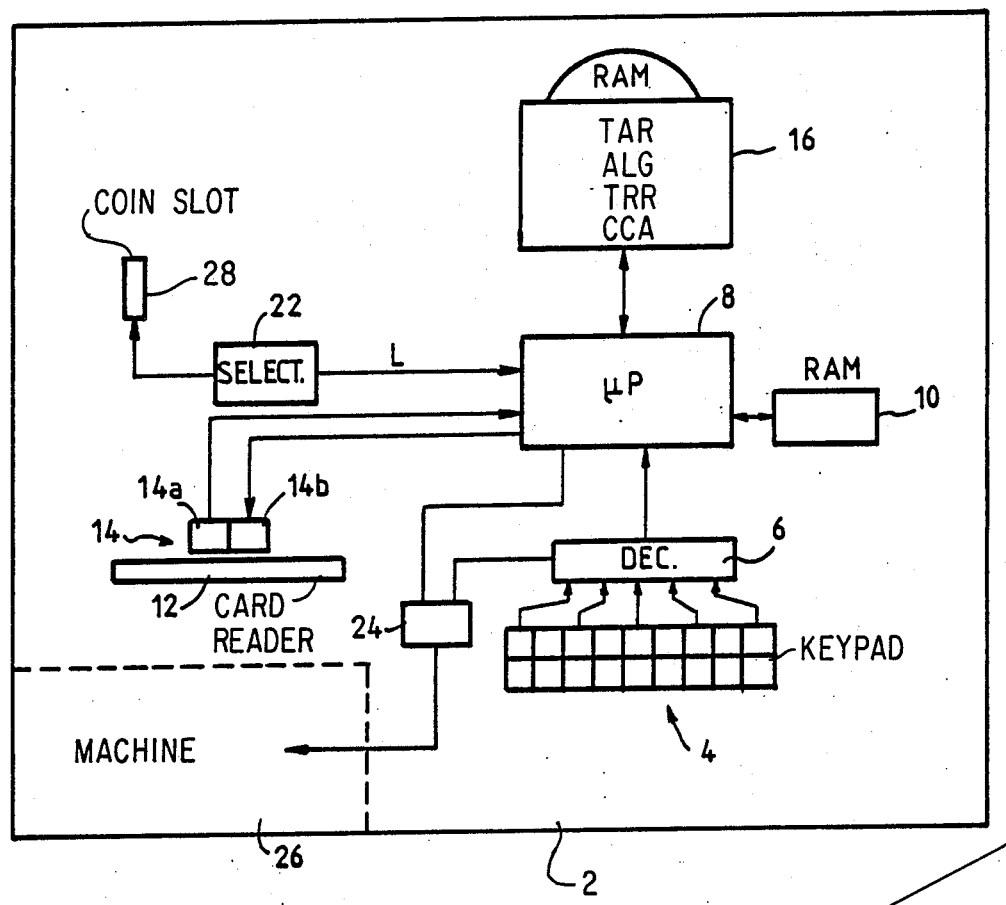
FIG. 2 is a simplified diagram of a service-supplying machine which operates in accordance with the invention.
Figure 2:
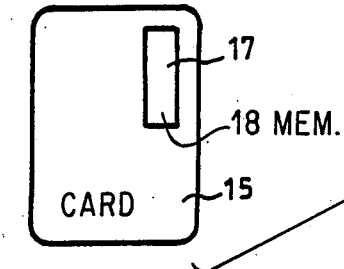
Figure 3:
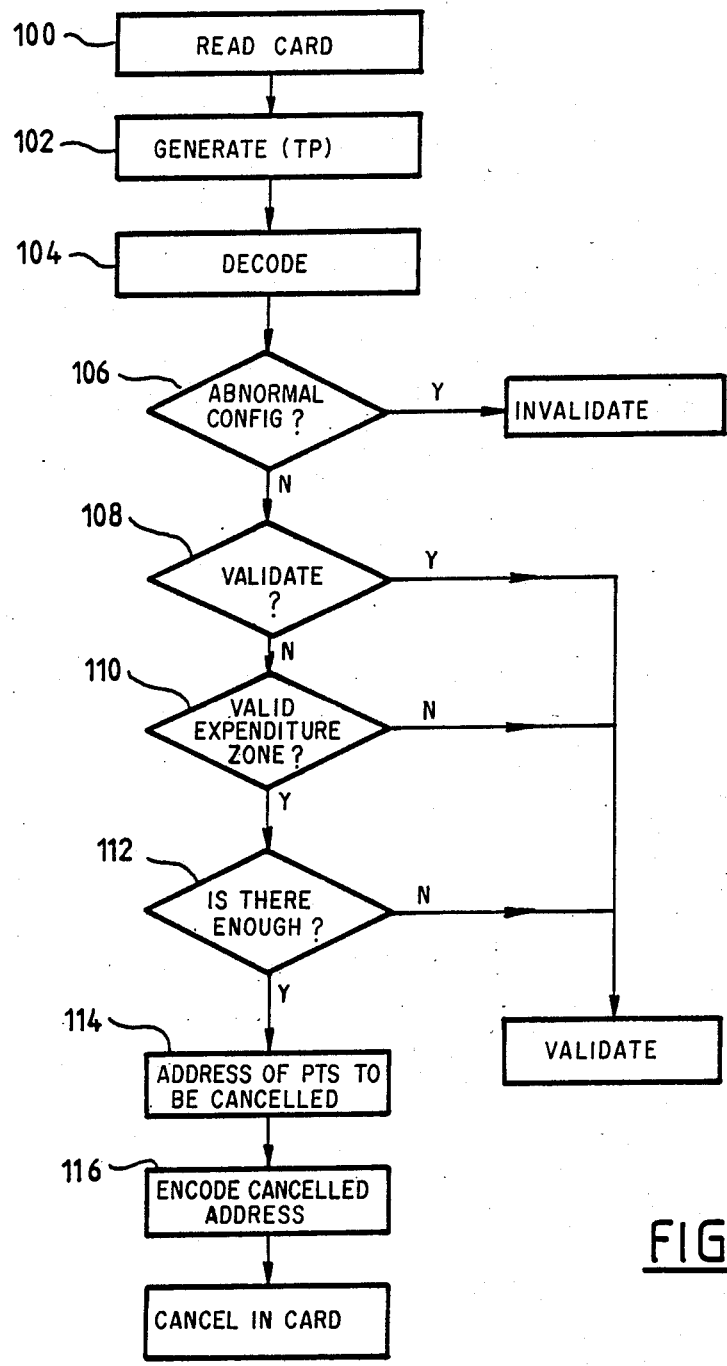
FIG. 3 is a flow chart for explaining how the FIG. 2 machine operates.

Reference is now made to FIGS. 2 and 3 while describing a particular embodiment of a system for supplying a service. This system is a fuel pump.

FIG. 2 shows the essential elements of the machine 2 for controlling hydrocarbon fuel delivery. It comprises a keypad 4 for keying-in the amount of fuel that a user wishes to obtain. The amount entered via the keypad 4 is converted by a decoder circuit 6 into a number corresponding to expenditure units. The number of units is transmitted to a microprocessor 8 which stores this data temporarily in a working memory 10. The machine 2 also includes a slot 12 through which a card such as 14 may be inserted, or more generally through which a data medium may be inserted.

Functionally, the card 15 comprises a medium for recording binary data. Data is stored either in magnetic form, in which case the memory is constituted by a magnetic track, or else in electronic form, in which case the memory is constituted by an integrated circuit which is essentially constituted by a memory circuit of the PROM, the EPROM, or the EEPROM type, or of an equivalent type. The card insertion slot 12 is associated with a read/write head 14. The read/write head 14 is electronic or magnetic depending on the type of card in use, and serves to read all of the data contained in the card memory and to write data to physical addresses specified by the machine. The machine also includes a memory 16 of the backed-up RAM type which contains the program corresponding to the operating sequences which are described below, the table of reference addresses TAR, the table of reference relationships TRR, the fixed elements of the algorithm ALG for generating the permutation table TP, and the fixed elements for defining the algorithm that specifies abnormal configuration criteria (CCA) as explained below.

When the user inserts a card 15 in the card reader slot 12, the reader 14a reads all of the data stored in the memory 16 of the card. The microprocessor 8 receives the fixed data IF and the list of physical addresses of the memory point that have been cancelled in the card. This corresponds to step 100 in the flow chart of FIG. 3. Using the fixed data IF and the algorithm elements (ALG) stored in the memory 18, the microprocessor 8 generates the inverse of the permutation table (TP) specific to the card (step 102 of the FIG. 3 flow chart). From the inverse permutation table (TP) the physical addresses as read are decoded in order to obtain the corresponding reference addresses (step 104).

In the next step 106, the abnormal configuration criteria (CCA) algorithm is implemented. This algorithm is based on the reference relationship table (TRR). It consists in ensuring that none of the cancelled memory points corresponds to a nonvalidated expenditure zone, or that those memory points within an expenditure zone which are cancelled actually occupy appropriate positions, etc.

If the algorithm detects an abnormal configuration, the card is refused or invalidated. Otherwise, the program executes step 108 which consists in determining whether the user wishes to revalidate a card or wishes to validate the card for the first time. This information is delivered by a coin selector 22 which delivers a signal L to the microprocessor 8. If this signal is not present, step 110 consists in verifying whether a validated expenditure zone actually exists in the card. If there is at least one validated expenditure zone, the program verifies that the amount remaining in the validated expenditure zone(s) is not less than the value of the requested transaction. A transaction is requested by the user keying in the amount of the desired service using the keypad 4. The decoder 6 converts this amount into a number of units. This information is stored temporarily in the random access memory 10 and it is compared with the number of units available in the validated expenditure zone(s) at step 112. If there are sufficient validated expenditure points, the program moves on to the next step 114. In this step, the microprocessor performs the following operations: it uses the reference relationship table (TRR) to determine the reference addresses $C_{i,j}$ of the expenditure points to be cancelled. These reference addresses are stored temporarily in the memory 10. The microprocessor then generates the permutation table (TP) using the fixed data IF as already read from the card memory together with the information ALG which is stored in the memory 18. Using the stored reference addresses $C_{i,j}$ and the permutation table (TP), the microcomputer 8 generates the physical addresses of the memory points in the card memory 17 which are to be cancelled. This step is referenced 116 in FIG. 3.

Using the physical addresses as generated in this way, the microprocessor 8 transmits data to the read/write head 14 suitable for cancelling, i.e. for changing the binary state, of those memory points in the card memory 17 which have the previously generated physical addresses.

When all of these operations have taken place, the circuit 24 instructs the machine 26 for supplying the service to deliver that service to an amount corresponding to the credit which has been taken from the card memory. In the particular example under consideration, the machine 26 is a fuel dispenser.

In the preceding portion of the description, it has been assumed that the card has enough validated expenditure points, i.e. that the results of the tests at steps 108, 110, and 112 were all positive.

We now assume that test 108 gives a negative result, i.e. that the card does not have any cancelled validation points. This means that the user is using the card for the first time. A certain amount of money must therefore be inserted in the coin slot 28 in order to validate one or more zones on the card. The coin selector 22 delivers a signal L representative of the amount of money inserted. The microprocessor converts this amount into a number of zones to be validated. In this case the first zone(s) is/are validated. The microprocessor generates the reference addresses of the corresponding validation points together with the permutation table TP on the basis of the fixed data IF as already read. The system then generates the corresponding physical address(es) using the reference address(es) $V_j$ and the permutation table TP. The microprocessor then causes the read/write head 14 to cancel the memory point(s) in the card memory 17 having the previously calculated physical addresses. One or more zones of the card are thus validated.

If it is the test 112 which gives a negative result, that means that although there already exist zones that have been validated, the remaining credit is not enough. As a result, the user must validate one or more new zones. The user proceeds as described above. The difference lies in the fact that the system has already read the physical addresses of the cancelled memory points, and has already converted them into reference addresses which are temporarily stored in the RAM 10. By applying the reference relationship table (TRR) the microprocessor determines the reference address(es) of the validation point(s) to be cancelled. The reference address(es) is/are converted into physical address(es) and the memory point(s) at said address(es) is/are cancelled.

It will be understood from reading the above description that the system in accordance with the invention makes it possible to use re-fillable data mediums under highly satisfactory conditions of security. As already mentioned, the physical addresses of the validation points change from one data medium to another since the permutation table (TP) depends on the fixed data item (IF) stored in the data medium.

If a fraudster cancels memory points in the card at random, the probability of cancelling at the first attempt the memory point whose physical address corresponds to the validation point which should be cancelled next is very low. If the first point cancelled corresponds to an expenditure point, the first attempt at inserting the card into a reader will cause the reader to detect an abnormal configuration and the card will be invalidated.

In addition, it will be understood that this system can operate with a wide variety of different data mediums.

All that is required is that each recording point should be detected by the processing machine and that each memory point should have an initial state and a modified or cancelled state without it being possible to go back from the cancelled state to the initial state. The card may be made literally of card having boxes or squares, each corresponding to a memory point. It may also be a card having a magnetic track with each bit of the track corresponding to a memory point. Finally, the card may be of the electronic memory type as already mentioned.

The above description corresponds to the basic system in accordance with the invention. In this system, cancelling a validation point or an expenditure point requires only one memory point having a given physical address to be cancelled. In a second implementation of the invention, it is necessary to cancel a plurality of different memory points for each validation item or for each expenditure item, with each of the memory points concerned having its own reference address and its own physical address. In this case, the reference address table is modified since each validation item corresponds to a plurality of nonsequential reference addresses, and each expenditure item corresponds to a plurality of reference addresses, and these various reference addresses may be interleaved. Naturally there is a still a disposition of the same type in the card memory for physical addresses per se. The permutation table (TP') is naturally more complex since it defines a one-to-one relationship between each reference address for information points and each physical address for memory points in the memory medium. It will also be understood, that for the same reasons, the abnormal configuration criteria algorithm will also be more complex. However, this variant implementation provides even greater security against attempted fraud. It is then necessary for the fraudster to discover that each validation item or each expense item corresponds to a plurality of physical addresses, e.g. 2, and in addition the fraudster must discover a pair of addresses corresponding to the same data item from amongst the physical addresses that have not yet been cancelled. It will be understood that the probability of doing this is very low.

In the above description, it was assumed that the memory card was useable for obtaining one type of service only, for example the supply of fuel. However, a single card may serve to obtain the supply of several different services. For example service 1 could correspond to obtaining fuel, service 2 could correspond to telephone calls, and service 3 could correspond to making purchases in a given chain of stores.

Each service corresponds to machines which are specific to providing the particular service. Similarly, within the memory of each card there exists validation and expenditure points or data items specific to supplying each service. Reference is made to FIG. 4 for explaining how this variant of the invention may be implemented.

Diagram A of FIG. 4 shows a table of reference addresses (TAR) and a table of reference relationships TRR which may be identical, for example, to those shown in diagram A of FIG. 1. These same tables TAR and TRR are stored in all machines regardless of the service to which they give access. The reference address table comprises n addresses, e.g. 110 in the present example.

We now consider a memory card which can be used for obtaining the supply of any one of three different services: it includes a zone $Z_F$ of fixed data which includes, in particular, fixed data $I_F$, and 3n physical addresses of memory points that are capable of being cancelled, i.e. a total of 330 points in the present example.

For each of the three services that can be obtained, the corresponding machine includes fixed algorithm elements in its memory. These fixed elements are referenced respectively $ALG_1$, $ALG_2$, and $ALG_3$, and they are associated with services 1, 2, and 3, respectively. In operation, these algorithms $ALG_1$, $ALG_2$, and $ALG_3$ are defined in such a manner that for a given value IF, the physical addresses of the memory of the card which are associated by the reference address table TAR by the permutation tables $TP_1$, $TP_2$, and $TP_3$ respectively are all different. Diagrams B, C, and D show one example of the physical addresses of the data points in the common reference address table corresponding respectively to the permutation tables $TP_1$, $TP_2$, and $TP_3$.

More precisely, in each of the diagrams B, C, and D the meanings of some of the data points are marked (C for an expenditure point, and V for a validation point). The physical address of each box whose meaning is given is marked above that box. And beneath each such box, information corresponding to the reference relation table is marked on a first line (j for V and i,j for C) while the number of the corresponding service, 1, 2, or 3 is marked on a second line.

We now describe the operation of a system enabling users to obtain the three services under consideration. Each machine is exactly the same in structure as the machine already described with reference to FIG. 2. Preferably, the portion 26 of each machine 2 is specialized in supplying a given service, e.g. dispensing fuel, setting up a telephone call, etc.

In contrast, a portion of the contents of the memory 18 is adapted in each case to the service supplied. The reference address table and the reference relationship table TAR and TRR are the same in all machines. However, the fixed algorithm elements $ALG_1$, $ALG_2$, and $ALG_3$ are distinct. The abnormal configuration criteria algorithm is likewise the same for all of the machines.

When the user inserts a card in the slot 12 of the card reader 14, the reader begins by reading the fixed data IF. On the basis of this data and of the fixed algorithm elements, e.g., $ALG_2$, the corresponding permutation table $TP_2$ is generated, thereby giving the list of all the physical addresses in the memory which are associated with the service under consideration (i.e. the service 2 in the present example). The reader 14 reads the status of each memory point (i.e. blank or cancelled) at the previously established addresses. From this stage on, the process already described with reference to FIGS. 2 and 3 takes place as from step 102.

In the example described with reference to FIG. 4, the reference address table TAR and the reference relationship table TRR are the same for all of the services. This means that there are as many reference addresses N as there are physical addresses in the card memory (N). These reference addresses are constituted by addresses $n_1$ corresponding to service 1, $n_2$ corresponding to service 2, and $n_3$ corresponding to service 3 (with $n_1+n_2+n_3=N$). The fixed algorithm elements $ALG_1$ serve, via the table $TP_1$ to associate each of the $n_1$ reference addresses for the service 1 to $n_1$ physical addresses in the card memory. A similar disposition applies to services 2 and 3. As a result a one-to-one correspondence is established between the entire set of reference addresses and the entire set of physical addresses by means of the permutation tables $TP_1$, $TP_2$, and $TP_3$.

In this case the machine 2 operates in exactly the same way as described with reference to FIGS. 2 and 3. When the user has inserted a card into the slot 2, the reader 14 reads all of the data contained in the card memory, including the fixed data IF. The microprocessor generates the inverse permutation table $TP_1^{-1}$ if it is a machine for supplying service 1, and the remainder of the process takes place as already described with reference to FIG. 3.

Naturally, as described above, each validation data item or each expenditure item may be stored by cancelling a plurality of memory points. For example, each item may be stored by cancelling two memory points. Although this solution requires twice as many memory points for a given quantity of information, it considerably increases the reliability of the system.

I claim:

1. A revalidatable service supplying system based a plurality of sets of expenditure data items with each expenditure data item being capable of being cancelled solely if a validation data item corresponding to its set has already been cancelled, the system comprising:

a plurality of data mediums, each medium including a plurality of cancellable memory points each having a physical address; and a plurality of service-supplying machines each including read means for reading the states of said memory points and write means for cancelling memory points; each medium including a fixed data item which is specific to that medium and which is readable by each machine; and each machine including means for defining, as a function of said fixed data item, a configuration of physical addresses of memory points on the medium corresponding respectively to validation data items and to expenditure data items, together with the relationships between each validation data item and the corresponding set of expenditure data items.

2. A system according to claim 1, in which each machine includes means for comparing the physical addresses of the memory points which have been cancelled in the data medium with said configuration of physical addresses and with said relationships.

3. A revalidatable service supplying system according to claim 1, in which said means for defining said configuration of physical addresses and said relationships comprises:

means for storing a reference address table and a reference relationship table, the reference address table serving to associate each reference address with at least a portion of an expenditure data item or with at least a portion of a validation data item, and the reference relationship table serving to associate each reference address which is associated with an expenditure data item with the, or each, address of the validation data item from which the expenditure data item depends; and means for generating a permutation table by using a predetermined algorithm common to all of the machines and said fixed data item of each card, with said permutation table establishing a one-to-one relationship between the set of said reference addresses and the set of said physical addresses.

4. A system according to claim 3, in which said reference relationship table defines an order relationship between the various reference addresses of the memory points within the same set of expenditure data items, said order being the order in which the memory points of the data medium should be cancelled when supplying services.

5. A system according to claim 1, in which each validation data item and each expenditure data item is associated with a single physical address and therefore with a single reference address.

6. A revalidatable system for supplying a plurality of services, wherein for each service there exists a plurality of sets of expenditure data items, with each expenditure data item being capable of being cancelled in order to obtain the corresponding service only if a validation data item corresponding to said set of expenditure data items has already been cancelled, the system comprising:

a plurality of data mediums for giving access to at least two of said services and comprising a plurality of memory points which are capable of being cancelled and each of which has a physical address; and a plurality of machines each of which is capable of supplying at least one of said services, each machine including read means for reading the state of said memory points and write means for cancelling memory points;

each data medium including a fixed data item which is specific to the medium and which is readable by the machine; and each machine including means for defining, as a function of said fixed data item, a configuration of physical addresses selected from the memory points in the medium corresponding to a particular service, and attributing some of the memory points therein to validation data items and the others to expenditure data items for said service, the machine also including means for defining the relationships between each validation data item and a corresponding set of expenditure data items, with the physical addresses of memory points on a medium for any one service being different from the physical addresses of memory points on the same medium for the other service(s).

* * * * *